April 7, 1959    K. C. ALLEN ET AL    2,880,643
COMPUTING SCALE
Filed Feb. 28, 1956
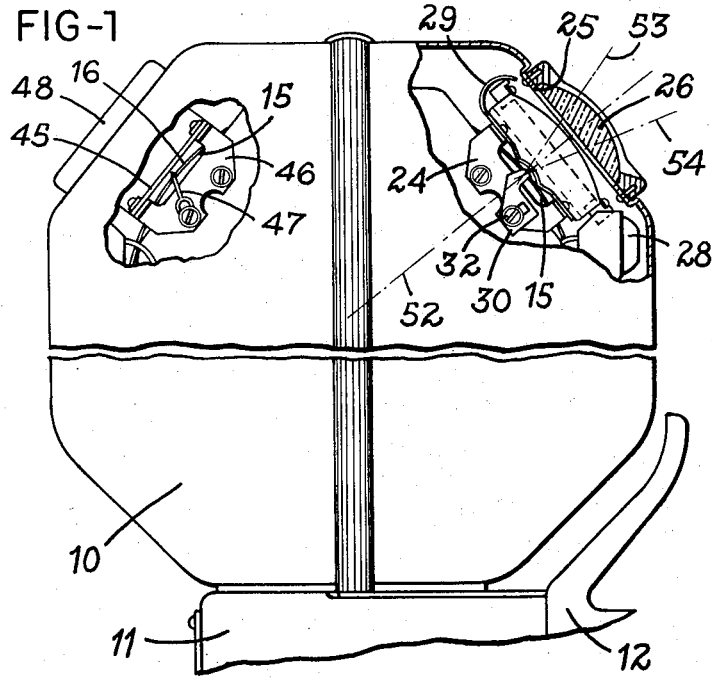
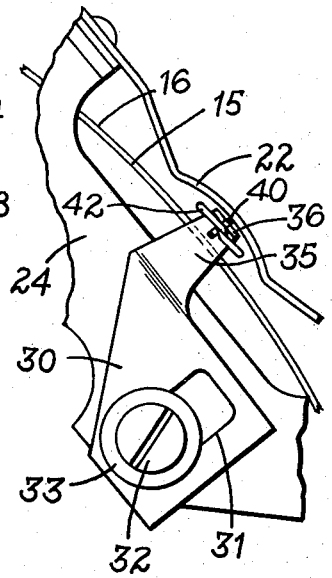
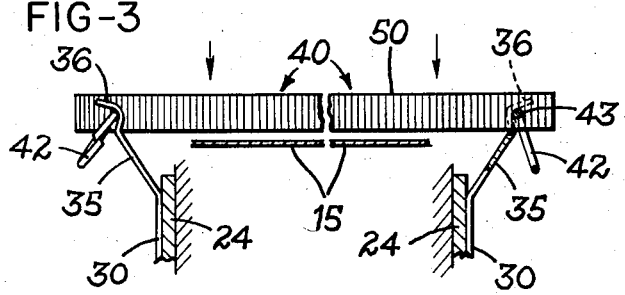
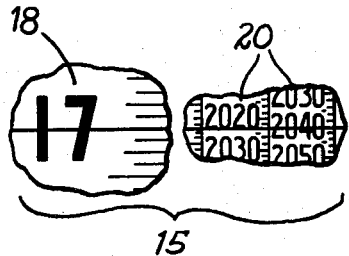
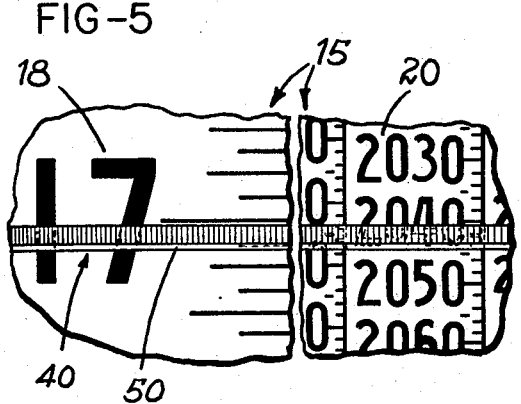
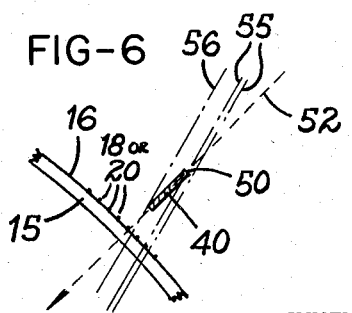
INVENTORS
KENNETH C. ALLEN &
BY ERNEST A. REUSSENZEHN
*Marechal, Biebel, French & Bugg*
ATTORNEYS United States Patent Office 2,880,643
Patented Apr. 7, 1959

2,880,643

COMPUTING SCALE

Kenneth C. Allen and Ernest A. Reussenzehn, Dayton, Ohio, assignors to The Hobart Manufacturing Company, Troy, Ohio, a corporation of Ohio Application February, 28, 1956, Serial No. 568,371

1 Claim. (Cl. 88—1)

This invention relates to computing scales and to an indexing mechanism for a computing scale which provides for accuracy of reading with elimination of difficulties resulting from parallax.

In a conventional scale construction wherein a wire is provided as the index line for use in reading the chart, it is essential that clearance be provided between the wire and the face of the chart in order to prevent frictional contact therebetween, and this leads to practical difficulties. In particular, if the wire and the chart are just barely out of contact, there will be less possibility of error in reading the scale because parallax will be at a minimum, but such conditions will increase the possibility of the development of frictional contact between the wire and chart in the event of change from the initial adjustment such as may develop in use, and also the establishment of such closely adjusted conditions requires a high degree of accuracy in the initial assembly of the scale.

Because of the above practical difficulties, it is customary to provide some definite clearance between the wire and the chart, but the restrictions thereon are fairly severe since the extent of this clearance directly affects the degree of parallax, and this in turn can affect the accuracy of reading the scale unless adequate precautions are taken. More particularly, the initial adjustment of the scale will be with respect to a specific viewing angle, and depending upon the extent of the parallax provided by the spacing of the wire from the chart, errors in reading may result if the chart is viewed in use from an angle other than the angle used as a reference when the scale was adjusted.

The difficulties outlined above are proportionately increased if the scale includes a magnifying lens such as is commonly used on scales having drum type charts, the lenses in such cases usually being of the cylindrical type. Such a lens will magnify the clearance between the wire and chart, thus increasing the possible parallax and correspondingly increasing the possibility of incorrect viewing of the chart.

The problems outlined above, and the possibilities of error to which they give rise, have been officially recognized by the regulations with respect to weights and measures in the several states, which establish a legal maximum spacing between the indexing wire and the chart of only 0.06 inch in the absence of a magnifying lens, and this clearance must be reduced if a lens is used. For example, if the lens has a magnifying power of 2 X, then the maximum spacing is reduced to 0.03 inch, and so forth. This in turn increases the practical difficulties attending the initial adjustment of the wire as discussed above, as well as the likelihood of frictional contact developing between the wire and the chart in use.

Having in mind that some clearance is necessary with a reading wire, the possibility of errors caused by the resulting parallax can be minimized if some provision is made for aiding the observer to establish his eyes at the proper viewing angle. For example, two wires may be mounted in spaced relation from each other and from the chart along the proper reading plane, so that when the eyes of the observer are properly aligned, only one line is observed, with the closer wire covering the line provided by the wire farther from the eyes. However, with such an arrangement it is possible that due to light reflection or some other cause, the observer might not notice one wire, with the possibility that he might incorrectly read by means of the wrong wire. It has also been proposed to use end or center reference points to identify the proper reading plane, but such reference points can be easily overlooked, especially when the observer is making several readings in a hurry.

Accordingly, the primary object of the present invention is to provide an indexing mechanism for a weighing scale which establishes the eyes of the observer in the proper reading plane, and which cannot be accidentally misread or overlooked while reading the scale.

Another object of this invention is to provide such an indexing mechanism for a weighing scale in the form of an index tape of substantially greater width than thickness supported with the width of the tape extending in a plane at a predetermined reading angle with respect to the indicia on the chart to define a reading line, and to establish accurate alignment of the eyes of the operator with respect to the reading line and the chart by providing a surface which is obviously too wide for precise reading when viewed from an improper angle.

It is also an object of this invention to provide such an index tape having one or both of the wider portions thereof of a color which contrasts with the edge of the tape facing the operator to afford a visual indication to the operator when his line of vision is improperly aligned with respect to the edge of the tape and the chart.

Other objects and advantages of the invention will be apparent from the following description, the accompanying drawing and the appended claim.

In the drawing—

Fig. 1 is a side view, partly in elevation and partly in section, of a scale incorporating the features of this invention;

Fig. 2 is an enlarged detail view of the portion of the scale adjacent the reading lens shown in Fig. 1, and illustrating the mounting of the index tape provided by the invention;

Fig. 3 is a somewhat diagrammatic view of the index tape and the mounting thereof with respect to the scale chart;

Fig. 4 is a broken detail view of portions of the weighing designations and price designations on the scale of Fig. 1, and showing the reading line extending across these designations;

Fig. 5 is an enlarged view similar to Fig. 4 illustrating the visual appearance of the index tape to the scale operator when the operator's line of vision is incorrectly aligned with respect to the chart and the index tape; and Fig. 6 is a side view of Fig. 5 illustrating proper and improper alignment of the line of vision with respect to the index tape and the chart.

Referring to the drawing, which illustrates a preferred embodiment of the present invention, and particularly to Fig. 1, a scale incorporating the features of the invention is shown as including a chart housing 10 mounted upon a base 11 and carrying a weight receiving platter 12. Suitable mechanism, for example such as disclosed in the patent to David A. Meeker et al., 2,723,113, issued November 8, 1955, links the platter 12 with a chart drum 15 to provide for rotation of the drum about its longitudinal axis in proportion to weight applied to the platter.

The chart 15 carries upon its surface 16 suitable indicia including weight designations 18 in terms of pounds and ounces or fractions of a pound, and price designations 20 arranged in columns parallel to the weight designations and adapted to cooperate with unit price designations carried upon a stationary price face 22 for computing the price of the weighed articles corresponding to the weight and price per pound. Frame means such as bracket members 24 are mounted within housing 10 at opposite sides of drum 15 to support price face 22 across and spaced from the surface 16 of the chart.

The housing 10 includes an opening 25 above the location of price face 22, and a cylindrical lens 26 is mounted within opening 25 to magnify the indicia on the price face and on the chart for reading purposes. A suitable light such as a fluorescent tube 28 is carried below opening 25, and a light shield 29 is supported at the upper or opposite edge of the opening to reflect light onto price face 22.

Each of the bracket members 24 carries an indicator holder 30 having an elongated slot 31 therein for receiving one of the mounting screws 32 of bracket 24, and a suitable washer 33 presses against holder 30 as the mounting screw is tightened. Each holder 30 includes a bifurcated arm 35 providing mounting slots 36 which are adapted to be positioned at a predetermined angle with respect to the surface of chart 16, and each of the bifurcated ends 35 is curved outwardly, as shown at 36 in Fig. 3.

The index tape 40 is received within the outwardly curved and slotted portions 36, and it is held in place by means of retaining rings 42 received within mounting holes 43 at opposite ends of tape 40. The holes 43 are preferably spaced apart somewhat less than the normal distance between the curved ends 36 of holders 30, and thus the bifurcated arms 35 are sprung inwardly toward the center of the drum to receive the retaining rings 42 behind curved arm portions 36, and thereby to support tape 40 in tension between the holders 30.

This construction maintains tape 40 in an extended flat condition which resists bending thereof, and it maintains that edge of the tape closest to the chart in the predetermined closely spaced relation with respect to the chart surface which is established by relative adjustment of the screws 32 and the slots 31 in holders 30. The scale may also include a reading station for the customer, generally showing only the weight, and such a station is shown in Fig. 1 as including a chart face 45 mounted on bracket members 46 which also carry a reading wire 47 extending across and spaced from the adjacent surface of chart 16. A suitable lens (not shown) may be provided within housing 48 for magnifying the weight designations to be viewed by the customer, and lighting equipment for chart face 45 also may be provided.

As previously mentioned, index tape 40 is substantially greater in width than in thickness, satisfactory results having been obtained with an extremely thin tape having a width of ⅛ inch and a thickness of 0.006 inch. The edge 50 of the tape farthest from the chart provides a reading line which extends across the surface of chart 16 beneath price face 22, and the substantial width to thickness ratio of the tape provides a useful means for aligning the eyes and line of vision of the operator with respect to the reading line and the indicia on chart 16. Thus tape 40 is supported so that the width thereof extends in a plane at a predetermined angle with respect to chart 16, generally substantially at right angles with respect to the chart surface.

In scales such as the one illustrated which incorporate a cylindrical lens 26 for magnifying the weight and price designations on the chart, the reading line is coincident with the central axis of the cylindrical lens indicated by the line 52 in Fig. 1, and when the eyes of the observer are not in this proper reading plane, the parallax difficulties are increased, since the lens magnifies the clearance space between the index line and the surface of the chart. Also, when the line of vision is above or below the central axis of the lens, as along line 53 or 54, the image viewed will be somewhat distorted. With the surface of tape 40 extending in the proper reading plane, and coincident with the central axis of the lens, the alignment difficulties previously encountered are eliminated as follows.

With tape 40 supported along the plane which is proper for the line of vision in reading the chart, only the edge 50 of the tape will be visible to the operator, appearing as a thin line extending across the chart. If the operator's line of vision is above or below the correct reading plane he will see a projection of the width of tape 40, and the reading line will appear as a wider band extending across the chart. By moving his head until only the edge 50 of the tape is visible the operator can readily align his eyes in the proper reading plane.

The effect of this aligning feature is considerably enhanced in accordance with the invention by coloring the wide portions of the tape to contrast with edge 50. For example, satisfactory results have been obtained with the edge 50 painted a dull black and the upper and lower wide portions of the tape painted a bright red. Then if the operator sees red as he reads the scale, he realizes that his eyes are improperly aligned with respect to the index tape, and depending upon whether the red portion is above or below the black line provided by edge 50, he will move his head until only the black line is visible to him. At this location his eyes will be in proper reading alignment with respect to lens 26, tape 40, and chart 16.

A typical situation of misalignment is illustrated in Figs. 5 and 6, the condition shown being one where the eyes are above the proper reading plane, and corresponding approximately to the "too high" position 53 in Fig. 1. The tape 40 appears as a band extending across the face of the chart, covering a space equivalent to the distance between two adjacent graduations indicating one-half an ounce in weight and obviously too wide for precise reading. Referring to Fig. 6, the correct reading plane indicated by line 52 is shown as extending through the width of tape 40, whereas when viewed improperly from above this plane the edge 50 appears between the two projected lines 55, and the visible red width of tape 40 appears between line 56 and the line 55 closest thereto, i.e. above the black edge 50. The operator is thereby visually informed that he is reading too high, and upon lowering his eyes into the proper reading plane 52 he will view only the edge 50 of the index tape and will read the correct values, for instance as shown in Fig. 4. Conversely, if the red surface appears below the black edge, the operator is informed that he is reading from a position which is too low.

An additional advantage provided by this invention results from the fact that the clearance between chart 16 and the closer edge of tape 40 is not critical as contrasted with other types of index means such as wires. Thus instead of having to conform to a maximum spacing of a few hundredths of an inch as discussed hereinabove, the accuracy of the scale is not affected if the tape 40 is as much as one-eighth inch away from the chart. This in turn facilitates the initial assembly of the scale as well as eliminating the possibility of the development of frictional contact between the tape and the chart.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a weighing scale of the character described, a drum chart having graduated indicia on one surface thereof, mechanism including frame means at opposite ends of said chart supporting said chart for rotation about the longitudinal axis thereof in proportion to weight applied to the scale, an extremely thin opaque index tape of substantially greater width than thickness having one edge thereof colored to provide a reading line and having the wide surfaces thereof colored in contrasting relation with said one edge, a pair of resilient arms mounted on said frame means adjacent opposite ends of said chart and supporting the opposite ends of said tape to maintain said tape in tension with said colored edge thereof facing away from said chart, a lens supported by said frame means on the opposite side of said tape from said chart and adjacent said colored edge of said tape for magnifying portions of said tape and adjacent portions of said indicia, and means forming an adjustable connection between each of said supporting arms and said frame means providing for adjustment of said arm generally radially of said chart and also about an axis parallel with said chart to establish said tape in substantially uniformly spaced relation with said chart and with the width of said tape contained in a reading plane coexistent with the central axis of said lens for accurate alignment of the eyes of the user in said reading plane and with said contrastingly colored wide surfaces of said tape providing a readily distinguishable indication of misalignment of the eyes with said reading plane.

References Cited in the file of this patent

UNITED STATES PATENTS

| | | |
|---|---|---|
| 1,669,428 | Strachan | May 15, 1928 |
| 1,689,725 | Hurt | Oct. 30, 1928 |
| 1,706,519 | Booth | Mar. 26, 1929 |
| 1,729,106 | Hallwood | Sept. 24, 1929 |
| 1,973,685 | Marshall | Sept. 11, 1934 |

FOREIGN PATENTS

| | | |
|---|---|---|
| 321,877 | Great Britain | Nov. 21, 1929 |